(12) United States Patent
Moretti et al.

(10) Patent No.: US 6,428,055 B1
(45) Date of Patent: Aug. 6, 2002

(54) RELEASABLE QUICK COUPLING FOR METAL PIPES

(75) Inventors: Erminio Moretti, Grenoble; Albert Raymond, Seyssinet; Gilles Perrin, Grenoble, all of (FR)

(73) Assignee: A. Raymond & CIE (FR)

( * ) Notice: Subject to any disclaimer, the term of this patent is extended or adjusted under 35 U.S.C. 154(b) by 0 days.

(21) Appl. No.: 09/623,772

(22) PCT Filed: Feb. 23, 1999

(86) PCT No.: PCT/EP99/01171
§ 371 (c)(1),
(2), (4) Date: Sep. 5, 2000

(87) PCT Pub. No.: WO99/45306
PCT Pub. Date: Sep. 10, 1999

(30) Foreign Application Priority Data

Mar. 5, 1998 (DE) .......................... 198 09 313

(51) Int. Cl.[7] .................................. F16L 39/00
(52) U.S. Cl. .................. 285/319; 285/308; 285/305
(58) Field of Search ................. 285/308, 319, 285/305

(56) References Cited

U.S. PATENT DOCUMENTS

| | | | | |
|---|---|---|---|---|
| 4,842,309 A | * | 6/1989 | LaVene et al. | ............... 285/319 |
| 5,181,751 A | * | 1/1993 | Kitamura | ................. 285/308 X |
| 5,275,443 A | * | 1/1994 | Klinger | ................... 285/305 X |
| 5,374,088 A | * | 12/1994 | Moretti et al. | .............. 285/305 |
| 5,607,190 A | * | 3/1997 | Exandier et al. | ........ 285/308 X |
| 5,924,746 A | * | 7/1999 | Fixemer | ................. 285/319 X |
| 6,106,028 A | * | 8/2000 | Godeau et al. | ............. 285/319 |
| 6,155,612 A | * | 12/2000 | Szabo | ......................... 285/319 |
| 6,318,764 B1 | * | 11/2001 | Trede et al. | ................. 285/305 |

* cited by examiner

Primary Examiner—Lynne H. Browne
Assistant Examiner—David E. Bochna
(74) Attorney, Agent, or Firm—Gifford, Krass, Groh, Sprinkle, Anderson & Citkowski, P.C.

(57) ABSTRACT

A connection unit of a releasable quick coupling that includes a cylindrical housing head, connecting sleeve, support sleeve and a ceiling ring. The cylindrical housing head defines a receiving space and includes a retaining element having movable edges that are directed into the receiving space. A tubular inserting part having a encircling retaining rib is insertable into the receiving space such that the retaining rib is engaged by the retaining element. The connecting sleeve is molded an end of the housing head and is adapted to be inserted into the end of the pipeline. The body of the connecting sleeve and detents of the housing head form a mounting space that is adapted to receive and secure an edge of the pipeline. Additionally, a support sleeve is mounted on the connecting sleeve at a second end opposite said housing head. Finally, a sealing ring is disposed within the support sleeve.

9 Claims, 2 Drawing Sheets

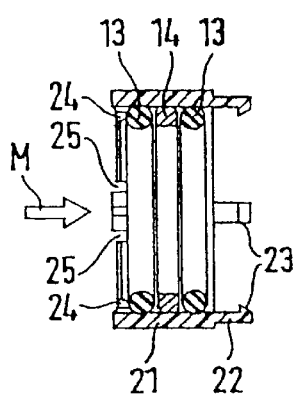
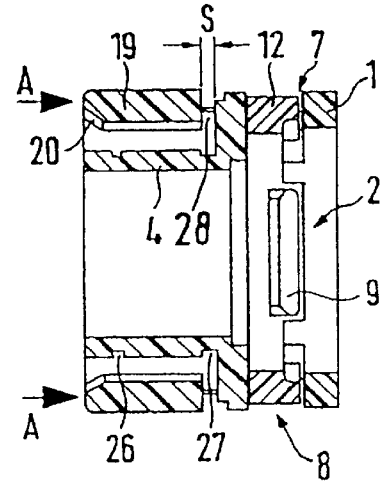
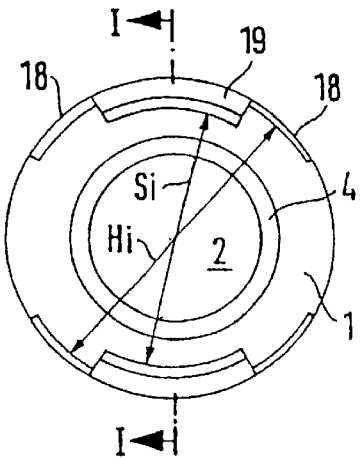
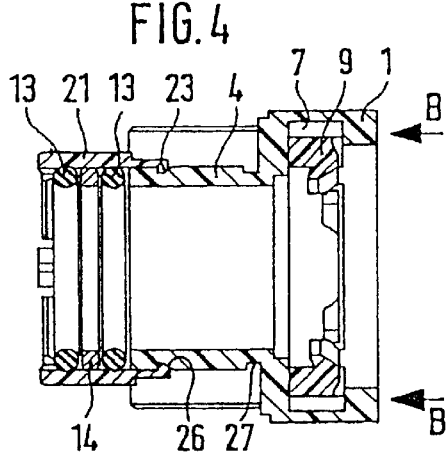
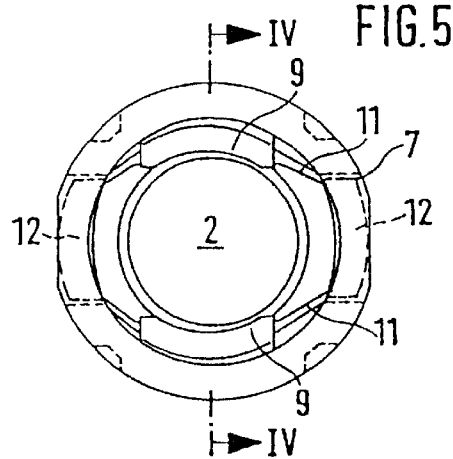
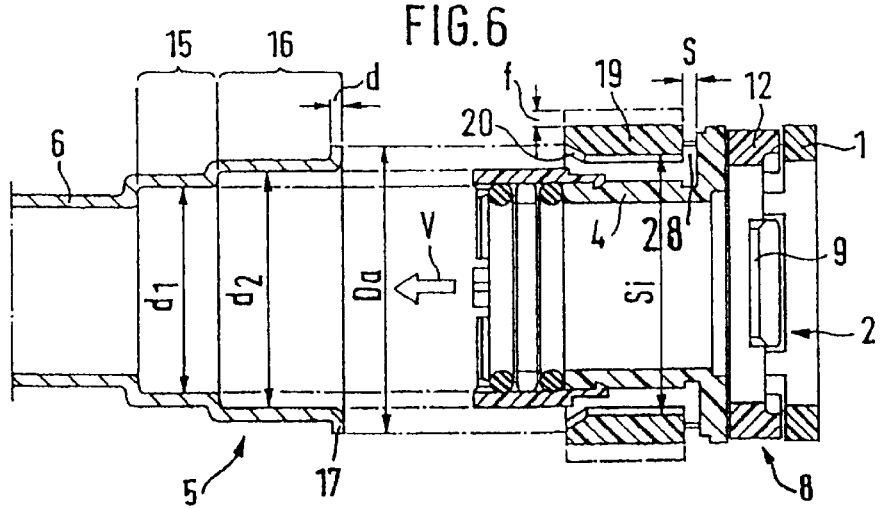

RELEASABLE QUICK COUPLING FOR METAL PIPES

BACKGROUND OF THE INVENTION

I. Field of the Invention

The invention relates to a connection unit for a releasable quick coupling for connection to an end of a metal pipeline, said end being expanded step-wise.

II. Reference to the Prior Art

Prior art quick couplings of the type disclosed by the present invention are shown in: EP 0 806 597 that issued Nov. 12, 1997 for a Quick Acting Coupling; WO 95/10002 that issued Apr. 13, 1995 for a Quick Connect Stuffer Pin; DE 197 22 842 A that concerns a detachable rapid-action coupling device, and; DE 43 00 037 that concerns a Releasable Socket Coupling Device for Pipe.

SUMMARY OF THE INVENTION

A connection unit according to the present invention includes a cylindrical housing head with a receiving area for the insertion of a tubular inserting part that is provided with an encircling retaining rib at a distance from the end of the pipe.

The connection unit furthermore includes a separate retaining element with elastically expandable detent edges directed radially into the receiving area to catch behind the retaining rib after the insertion of the inserting part as well as a connecting sleeve formed on the housing head, said connecting sleeve being inserted into the expanding end of the metal pipeline and being anchored there together with sealing rings lying sealingly on the inserting part.

In this case the inserting part can be the end of a stable metal pipe which, for example, is used for fuel lines. It can however also consist of rigid or hard elastic plastic or other customary injection molding material which can be connected according to the prior art via a connecting conduit to a tube or pipeline (DE 43 00 037 C1).

A connection unit of this type is used in the case of a quick coupling formed in two parts and still not belonging to the state of the art (DE Application 197 22 842) in order to form the receiving housing rotatably with respect to the base body. The head part provided with the separate retaining element in this case also has a connecting sleeve which can be inserted and anchored in the tubular insertion area of the base body with its sealing rings forward, where the insertion of the sealing rings is associated with an additional mounting expenditure. In the case of this coupling, the base body, precisely like the corresponding head part, is made of plastic and is provided at its inserted end with a pipe conduit for connection to a tube line. The rotatability between the head part and base body alone is the sense and goal of the bipartite quick coupling.

It is the objective of the present invention to form the connection unit so that it, together with the sealing rings, can be connected to the end of pipe and fixedly anchored to it.

For the realization of the objective set, at least one expandable detent is formed on the housing head of the connection unit for locking the radially outwardly bent edge of the metal pipeline and at least one sealing ring can be positioned in front of the frontal side of the connecting sleeve by means of a supporting sleeve. Preferably, upon insertion of the connection unit into the expanded end of the pipeline, the support sleeve to slides forward, over the connecting sleeve, toward housing head while the connecting sleeve simultaneously urges the sealing ring into the end of said pipeline.

By the measures according to the invention it is achieved in a simple manner that on assembly of the quick coupling the sealing rings can be mounted together with the connection unit and the connecting sleeve can simultaneously be anchored and centered in the end of the pipe.

BRIEF DESCRIPTION OF THE DRAWINGS

In the drawings a preferred embodiment of a connection unit according to the invention is represented which will be explained in more detail in the following detailed description. Shown are FIG. 1, the housing head of the connection unit in longitudinal section according to line I—I in FIG. 2, FIG. 2, the lateral view thereof in the direction of the arrow A, FIG. 3, the supporting sleeve with sealing rings in longitudinal section in their position before being pushed onto the housing head according to FIG. 1, FIG. 4, the housing head with the supporting sleeve pushed on in a longitudinal section rotated by 90° according to line IV—IV in FIG. 5, FIG. 5, the lateral view thereof in the direction of the arrow B, FIG. 6, the completely mounted connection unit in the same longitudinal section as in FIG. 1 before insertion into the stepped end of a metal pipe, FIG. 7, the connection unit during the insertion of the connecting sleeve into the end of a metal pipe, FIG. 8, the connection unit after complete insertion of the connecting sleeve into the end of a metal pipe and locking of the rim, and FIG. 9, the connection unit anchored on the end of a metal pipe with coupled plug-in part.

DETAILED DESCRIPTION

Figure 7:
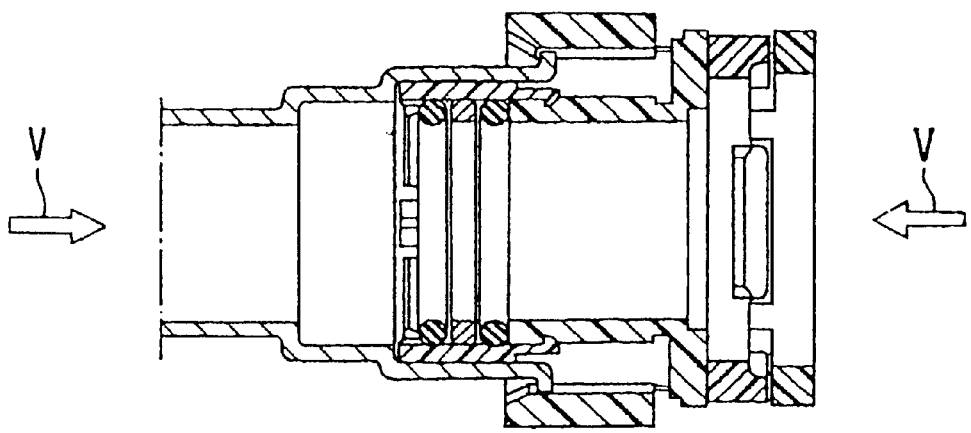

Referring now to FIGS. 1–6, the connection unit of the present invention includes a cylindrical housing head 1 with a receiving area 2 for the insertion of a tubular inserting part 3. A connecting sleeve 4 is formed on the housing head 1 in the axial direction and is insertable and anchored or locked in the end 5 of a metal pipeline 6 in a manner still to be described. Preferably, the end 5 of the pipeline is expanded in stages or graduated.

A recess 7 is located in the housing head 1 in which a separate retaining element 8 is imbedded transverse to the axial direction. The retaining element 8 is provided with two elastically expandable detent or retaining edges 9 which are directed radially into the receiving area 2. The detent edges being intended for the purpose of catching behind a encircling retaining rib 10 of the inserting part 3. The retaining rib 10 is formed such that it is positioned at a distance from the end of the pipe 6 (see FIG. 9) after the insertion of the inserting part 3. Preferably, the retaining element 8 is designed in the manner known from DE 43 00 037 C1 so that the detent edges 9 are connected to two pressure plates 12 lying diametrically opposite one another via V-shaped flexible stays 11 running together. These pressure plates 12 are imbedded in the recess 7 of the housing head 1 and can be compressed manually from outside in order to be able to release the inserting part 3 in case of need.

In order to seal the quick coupling against the medium flowing through, two sealing rings 13 are provided which are disposed together with an intermediate ring 14 in front of the frontal side of the connecting sleeve 4 in the expanded end 5 of the metal pipeline 6. Preferably, rings 13 and 14 lie sealingly on the outer casing of the inserting part 3 and the inner wall of the pipeline 6.

The end 5 of the metal pipeline 6 receiving the connection unit preferably has two pipe steps 15 and 16 offset outwardly and a rim or edge 17 bent radially outwards which can interlock with the housing head 1 on insertion of the connecting unit into the stepped end 5 of the pipe. For this purpose, two wall linings (18) lying diametrically opposite one another are formed on the housing head 1 concentrically to the connecting sleeve 4. Preferably, the wall linings having an inner diameter Hi equal to the outer diameter Da of the rim 17. At the wall linings 18, in turn, expandable detents 19 which project inwards and also lie opposite to one another are formed. Preferably, the detents 19 have an inner diameter Si that is smaller than the outer diameter Da of the edge 17.

The detents 19 have on their front side conically beveled insertion faces 20. Furthermore, the detent 19 preferably end shortly before the housing head 1 with a mounting space or gap 28 whose width S is somewhat greater than the thickness d of the rim 17. The wall linings 18 are interrupted on the width of the detents 19 to the housing head 1 so that the detents 19 can flex outwards during the insertion of the rim 17 by the amount f until the rim 17 has passed the narrow pass and can plunge into the gap 28. At that point the detents 19 flex once again into the starting position and the connection unit is fixedly connected to the end 5 of the pipe.

To simplify assembly, the two sealing rings 13 and the intermediate ring 14, as can be seen from FIG. 3, are housed in a supporting sleeve 21. Preferably, the sleeve 21 has a inner diameter that corresponds to the outer diameter of the connecting sleeve 4 and which has on its side facing the connection unit at least two detent stays 22 lying diametrically opposite one another. At the free end of the detent stays 22, inwardly directed, and beveled in the plug-on direction of the arrow M, detent hooks 23 are formed preferably lock in corresponding notches 26 on the outer wall of the connecting sleeve 4 for positioning of the supporting sleeve in front of the frontal side of the connecting sleeve 4.

The supporting sleeve 21 furthermore has at its opposite frontal side several inwardly projecting protuberances 24 distributed over the edge which hold the sealing rings 13 imbedded in the supporting sleeve 21 in place. On their other side these protuberances 24 are preferably beveled inwardly toward the edge and laterally encircled by short slots 25 so that the protuberances 24 can easily flex outwards.

Referring now to FIGS. 4 and 6–8, the supporting sleeve 21 has been pushed onto the connecting sleeve 4 and positioned by locking of the detent hooks 23 in the notches 26. Preferably, the mounting of the connection unit in the stepped end 5 of the pipeline 6 appears as represented in the mounting sequence according to FIGS. 6 to 8.

Figure 8:
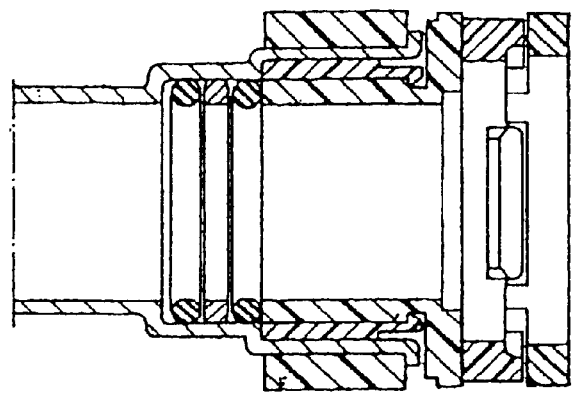

Referring now to FIGS. 6 to 8, the connection unit with its supporting sleeve 21 is pushed forward in the direction of the arrow V into the front pipe step 16 until the supporting sleeve 21 strikes the end of the pipe step 16 (FIG. 7). Thereby the edge 17 is pushed over the insertion bevel 20 between the detents 19 and presses the detents 19 apart into the position indicated with dotted lines in FIG. 6 corresponding to the amount f.

Figure 9:
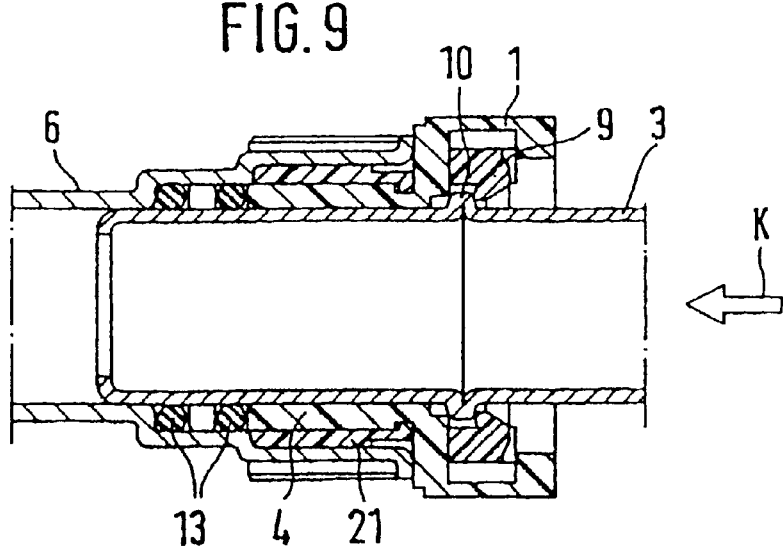

Thereafter the connection unit is pushed further in the direction of the arrow V into the end 5 of the pipe whereby the sealing rings 13 together with the intermediate ring 14 are inserted into the back step 15 of the pipe and the supporting sleeve 21 is simultaneously pushed back over the connecting sleeve 4 until the detent hooks 23 plunge in the encircling groove 27 at the end of the connecting sleeve 4. While this occurs. the edge 17 is pushed further through the detents 19 until it locks in the gap 28 and the detents 19 can o flex back into their original position. Still referring to FIGS. 6–9, the connection unit is held centered over the supporting sleeve 21 in the end 5 of the pipe while the sealing rings 13 provide for a sealing closure in the inner step 15 of the pipe when the inserting part 3 is inserted into the connection unit in the direction of the arrow K (FIG. 9).

Although the present invention has been described in terms of a specific exemplary embodiment, it will be appreciated that various modifications and alterations might be made by those skilled in the art without departing from the spirit and scope of the invention as set forth in the following claims.

What is claimed is:

1. A connection unit of a releasable quick coupling for connection to the end of a metal pipeline, said end being expanded step-wise, comprising:

a cylindrical housing head defining a receiving space for the insertion of a tubular inserting part which is provided with an encircling retaining rib and having a separate retaining element with movable retaining edges directed radially into the receiving space to catch behind the retaining rib upon insertion of the inserting part;

a connecting sleeve formed on said housing head, said connecting sleeve being insertable into the end of the metal pipeline and anchorable there together with at least one sealing ring lying sealingly on the inserting part characterized by the fact that detent means on the housing head are formed for locking a radially outwardly bent rim of the end of the metal pipeline and said sealing ring can be positioned in front of a frontal side of the connecting sleeve by a supporting sleeve and during the insertion of the connecting sleeve can be inserted into the end of the pipeline while the supporting sleeve is simultaneously pushed backwards over the connecting sleeve.

2. The connection unit according to claim 1, wherein said end of said pipeline further comprises a inner pipe step and a front pipe step offset outwardly and said at least one sealing ring has a outer diameter that corresponds to a inner diameter of said inner pipe step and a outer diameter of said supporting sleeve corresponds to a inner diameter of said front pipe step and a length of said supporting sleeve corresponds to a depth of said front pipe step.

3. The connection unit according to claim 2 wherein the supporting sleeve further comprises at least two detent stays lying diametrically opposite one another at whose free end, beveled in the inserting direction and inwardly directed, detent hooks are formed which lock in at least two large notches defined on the outer wall of the connecting sleeve during positioning of the supporting sleeve on the connecting sleeve and, on insertion of the connecting sleeve into the end of the pipeline, slide back over the connecting sleeve up to the back housing head and there plunge into a encircling groove.

4. The connection unit according to claims 1, wherein the detent means formed on the housing head comprises two wall linings lying diametrically opposite one another, said wall linings having a inner diameter that is equal to a outer diameter, and that, in the wall linings, inwardly projecting and beveled on the insertion side, detents are formed having an inner diameter that is smaller than a outer diameter, and which define with the housing head a gap whose width is greater than the thickness of the rim.

5. A connection unit of a releasable quick coupling for connection to a end of metal pipeline, said end expanding in stages and having a outwardly bent edge, said connection unit comprising:
- a cylindrical housing head, said housing head defining a receiving area for receiving a tubular inserting part and having a retaining element with at least one expandable retaining edge extending radially into said receiving area to secure said tubular inserting part upon insertion and having at least one detent;
- a connecting sleeve molded at a first end to said housing head, said connecting sleeve having a body adapted for insertion into the end of the pipeline, said body and said detent forming a mounting space adapted to receive and secure said bent edge of said of said pipeline;
- a support sleeve slidably mounted on said connecting sleeve at a second end opposite said housing head, and
- at least one sealing ring disposed within said support sleeve;
- whereby the insertion of said connection unit into said pipeline causes said bent edge to be received in said mounting space and secured by said detent and said support sleeve to slide over said connecting sleeve toward said housing head while said connecting sleeve urges said sealing ring into said end of said pipeline.

6. The connection unit of claim 5 wherein said connecting sleeve further comprises at least two mounting notches.

7. The connection unit of claim 6, wherein said support sleeve further comprises at least two detent stays extending outwardly from said support sleeve, said stays having detent hooks formed thereon adapted to engage said mounting notches of said connecting sleeve.

8. The connection unit of claim 5, wherein said at least one detent further comprises a conically beveled insertion face.

9. The connection unit of claim 5, wherein said support sleeve further comprises at least one inwardly projecting protuberance, said protuberance holding said sealing ring within said support sleeve.

* * * * *